United States Patent [19]
Kotone et al.

[11] 3,891,470
[45] June 24, 1975

[54] FERROUS METALS TREATED WITH IMIDAZOLE COMPOUNDS FOR CORROSION RESISTANCE

[75] Inventors: Akira Kotone, Nara; Masahiro Hoda; Takeshi Hori, both of Sakai, all of Japan

[73] Assignee: Sakai Chemical Industry Company, Ltd., Osaka, Japan

[22] Filed: Jan. 23, 1973

[21] Appl. No.: 326,002

[30] Foreign Application Priority Data
July 29, 1971 Japan................................ 46-56898

[52] U.S. Cl................ 148/6.14; 21/2.5 R; 21/2.7 R; 106/14; 117/127; 148/31.5; 252/8.55 E; 252/390; 252/392; 260/309
[51] Int. Cl. ........................ C23c 13/02; C23f 11/14
[58] Field of Search ............... 252/390, 392, 8.55 E; 21/2.5 R, 2.7 R; 117/127; 148/6.14, 6.35, 31.5; 106/14; 260/309

[56] References Cited
UNITED STATES PATENTS
2,618,608  11/1952  Schaeffer........................... 252/390

*Primary Examiner*—Benjamin R. Padgett
*Assistant Examiner*—Irwin Gluck
*Attorney, Agent, or Firm*—Armstrong, Nikaido & Wegner

[57] ABSTRACT

A volatile corrosion inhibiting composition for a ferrous metal which comprises an effective amount of an imidazole compound represented by the formula

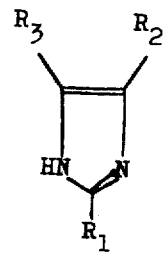

wherein each of $R_1$, $R_2$ and $R_3$ is a hydrogen atom, methyl, ethyl, propyl or isopropyl group.

5 Claims, No Drawings

FERROUS METALS TREATED WITH IMIDAZOLE COMPOUNDS FOR CORRISION RESISTANCE

This invention relates to volatile corrosion inhibitors for ferrous metals such as iron and steel.

Iron and steel materials are the most widely used of all the metals in various fields, but as compared with other metals they are more subject to marked corrosion in various atmospheres. In order to prevent the corrosion of iron and steel materials, therefore, it has been the practice to wrap them with paper, cloth, metal foil and sheets of synthetic resins which are impregnated or coated with volatile corrosion inhibitors.

Such volatile corrosion inhibitors must have sufficient solubility in water, good stability and resistance to heat, light and chemicals, sufficient volatility within a limited space so as to maintain an effective concentration over a prolonged period of time, satisfactory dispersibility in a vapor phase and low toxicity. However, a corrosion inhibitor has not been known yet which fulfills all of these requirements.

For instance, dicyclohexylamine nitrite, the most typical of all the volatile inhibitors presently used, has a poor solubility in water and is by no means stable, inasmuch as it starts to decompose at a temperature of about 100°C and undergoes decomposition when exposed to the sunlight. Because it is decomposed by acids and alkalis, it must be used in neutral conditions. Thus the nitrite is unable to exhibit a satisfactory corrosion inhibiting effect in hot and humid atmospheres and in the atmospheres of industrial areas suffering from pollution with sulfurous acid, hydrogen sulfide, etc. Furthermore, the compound is toxic ($LD_{50}$ : 300 mg/kg) and involves not a few problems in environmental sanitation. Being a nitrite of a secondary amine, the corrosion inhibitor is highly suspected of being a carcinogenic substance. Other volatile corrosion inhibitors for iron and steel materials already known are diisopropylamine nitrite, dicyclohexylamine caprylate, dicyclohexylamine carbamate, dicyclohexylamine carbonate, dicyandiamine nitrite, guanidine carbonate, a mixture of monoethanolamine benzoate, sodium nitrite and urea, etc., none of which, however, meets all the requirements with respect to toxicity, stability, corrosion inhibiting ability in vapor phase and solubility in water. In fact each of these substances contains a secondary amine which is strongly toxic and/or comprises a nitrite, carbamate or carbonate which is poor in resistance to heat, light, acids and alkalis.

Briefly, a volatile corrosion inhibitor for iron and steel has not been known yet which has an outstanding corrosion inhibiting effect in vapor phase, low toxicity, high solubility in water and good resistance to heat, light and chemicals.

In view of the present situation described, we have carried out extensive researches to obtain a volatile corrosion inhibitor for iron and steel which has the foregoing properties required for volatile corrosion inhibitors and found that imidazole compounds represented by the formula

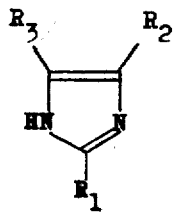

wherein each of $R_1$, $R_2$ and $R_3$ is a hydrogen atom, methyl, ethyl, propyl or isopropyl group are capable of exhibiting an outstanding corrosion inhibiting effect to achieve the above object. Thus this invention has been accomplished.

The imidazole compounds represented by the above formula to be used according to this invention include, for example, imidazole, 2-methylimidazole, 4-methylimidazole, 2,4-dimethylimidazole, 4,5-dimethylimidazole, 2,4,5-trimethylimidazole, 2-ethylimidazole, 2-ethyl-4-methyl-imidazole, 2-propylimidazole, 2-propyl-4-methylimidazole, 2-isopropylimidazole and 2-isopropyl-4-methylimidazole, among which the preferable are imidazole, 2-methylimidazole, 2-ethylimidazole, 2-ethyl-4-methylimidazole and 2-isopropylimidazole.

The imidazole compounds of this invention have an excellent volatile corrosion inhibiting effect on ferrous metals such as iron and steel over a prolonged period of time and have a high vapor pressure so that they exhibit a sufficient corrosion inhibiting effect even in hot and humid atmospheres, in the atmospheres of industrial areas polluted with sulfurous acid gas, hydrogen sulfide, etc. and in atmospheres on the sea. In fact, all the present imidazole compounds are found acceptable by the corrosion inhibiting test disclosed in MIL—I—22110A concerning crystalline volatile corrosion inhibitor.

The imidazole compounds of this invention have a suitable sublimation velocity and minimum effective concentration. Moreover, any imidazole derivative of the invention is very low in its toxicity as evidenced by $LD_{50}$ of 1500 to 3000 mg/kg and is free of a harmful physiological action on the human body. In addition, the compounds have very high solubility in water, thus fulfilling the requirements for the practical application of volatile corrosion inhibitors. For instance, whereas dicyclohexylamine nitrite has solubility of 3.9 wt. percent at 25°C, all the present imidazole compounds have solubility of at least 20 wt. percent at 25°C. Accordingly, aqueous solutions of the present inhibitors can be readily prepared for application to metals or for the impregnation of paper, cloth or the like to inhibit corrosion, and corrosion inhibiting paper will be produced advantageously at a low cost. The present imidazole compounds have another advantage that they can be readily removed from iron and steel materials by washing with water.

The imidazole compounds of the invention do not decompose even at 250°C and exhibit remarkable stability against heat and have excellent resistance to light and chemicals, as distinct from the volatile corrosion inhibitors heretofore available.

The present imidazole compounds can be used as they are or with adjuvants or carriers. For example, they can be used in the form of various preparations such as powder, tablet, solution, fumigant, etc., or by supporting them on sheet-like materials or adsorbent materials. The carriers on which the imidazole compounds of this invention are supported, are sheet-like materials such as paper, cloth, films and sheets of various resins, various metal foils, etc., and adsorbent materials such as silica gel, diatomaceous earth. Examples of resin films and sheets are those of polypropylene, polyethylene, ethyl cellulose, cellophane, polyvinyl butyral, etc. If the carrier is in the form of a sheet, it may be composed of a single layer or multiple layers which are laminated as by coating. To cause the carrier to support the imidazole compound, the compound may be used in the form of an aqueous solution but, for prompt drying, it may be applied as an aqueous solution containing an organic solvent. The organic solvent to be used for this purpose is preferably a hydrophilic solvent such as methanol, ethanol, isopropyl alcohol, acetone or the like. The imidazole compounds can be applied to the carrier by various methods. The sheet of carrier such as paper or cloth may be impregnated with the solution of the imidazole compounds, or the solution may alternatively be applied to the sheet by spraying or coating. The adsorbent material such as silica gel or diatomaceous earth can be impregnated with the solution of the imidazole compound. If a sheet-like material other than paper and cloth such as a sheet of polypropylene, polyethylene, cellophane, polyvinyl butyral or ethyl cellulose or metal foil is to be coated, it is possible to use various conventional methods such as flow coating, brush coating, roll coating, etc.

The amount of the imidazole compound to be contained in the carrier may be determined as desired and is not critical. But, generally, when sheet-like material is used as a carrier, the amount is about 0.5 to 50 g, preferably 1 to 30 g, per square meter of area of the sheet-like material, and when adsorbent materials are used as a carrier, the amount of the imidazole compound to be adsorbed is in the range of 10 to 50 percent by weight, based on the total weight of the compound and carrier.

In accordance with the present invention ferrous metal can effectively be prevented from corrosion by placing it in an atmosphere containing an effective amount of the present imidazole compound. For example, metal materials will be wrapped with the sheet thus prepared, or cartons or the like for encasing metal materials may be lined with the sheet to protect the metal surfaces from corrosion. In the case where silica gel, diatomaceous earth or like adsorbent substance is used as a carrier, the inhibitor-containing adsorbent substance will be placed in a suitable container or wrapped with paper, cloth or like air-permeable material and then placed in a sealed container in which metal materials are accommodated so as to enclose the metal materials in the vapor of the imidazole compound and to thereby prevent the metal surfaces from corrosion.

Further, ferrous metals can also be prevented from corrosion by contacting the metals with vapor of the imidazole compound generated from powder of the compound per se or from various preparations such as powder, tablet, solution, etc. Moreover, the preparation such as powder, solution, fumigant, etc., can be applied directly to ferrous metals by various methods, for example, by sprinkling, spraying, coating, fumigating, etc. to prevent the metal surfaces from corrosion.

Although the imidazole compound achieves an outstanding corrosion inhibiting effect when used singly, it is not in the least objectionable to use one or more of the conventionally well-known corrosion inhibitors in combination therewith. The imidazole compound can be used in combination with dicyclohexylamine nitrite, mixture of urea, sodium nitrite and monoethanolamine benzoate, dicyclohexylamine carbamate, diisopropylamine chromate, diisopropylamine dichromate, etc. or in combination with a volatile nitro compound such as nitrophenol, nitropropane, nitro compound of benzaldehyde, nitronaphthalene, etc. Further it can be used in combination with benzotriazoles, 3-amino-1,2,4-triazole, etc.

This invention will be described below in greater detail with reference to examples.

EXAMPLE 1

One gram of each corrosion inhibitor shown in Table 1 below was wrapped with air-permeable paper. The corrosion inhibitor used was in the form of powder passing through a 300-mesh screen.

The sample thus obtained was placed on the bottom of a 1-liter Erlenmeyer flask and clean-surfaced polished mild steel sheet (JIS—G—3141) was hung in the flask at the position of 50 mm above the bottom and then the flask was sealed. The humidity and temperature in the flask was kept at 95 percent and 25°C respectively for one week.

The surface of the steel sheet was inspected and the results were evaluated according to the following criteria:

3: No rusting.
2: Rust spots observed.
1: Rusting observed over the entire surface.

| Corrosion Inhibitor | Evaluation |
| --- | --- |
| imidazole | 3 |
| 2-methylimidazole | 3 |
| 2-isopropylimidazole | 3 |
| dicyclohexylamine nitrite | 2 |
| blank | 1 |

EXAMPLE 2

Vapor phase corrosion inhibition test by wrapping

Clean-surfaced polished mild steel sheets (JIS—G—3141) were wrapped with the following samples of corrosion inhibiting sheet and subjected to weathering test.

Sample 1
  Neutral kraft paper weighing 70 g/m² was impregnated with an aqueous solution of imidazole and then dried with air to prepare a sheet of corrosion inhibiting paper containing 5g of imidazole per square meter of the kraft paper.

Sample 2
  A 5 percent aqueous solution of 2-methylimidazole was sprayed to neutral kraft paper weighing 70 g/m² and the resulting paper was then dried with air to prepare a sheet of corrosion inhibiting paper containing 5g of 2-methylimidazole per square meter of the kraft paper.

Sample 3
  Neutral kraft paper weighing 70 g/m² was impregnated with a solution of 2-ethylimidazole in a 1 : 1 weight ratio mixture of ethanol and water and then dried with air to prepare a sheet of corrosion inhibiting paper containing 5 g of 2-ethylimidazole per square meter of the kraft paper.

Sample 4
  Neutral kraft paper weighing 70 g/m² was impregnated with an aqueous solution of equal amounts by weight of 2-ethyl-4-methylimidazole and dicyclohexylamine nitrite and then dried with air. The impregnated kraft paper was found to contain 5 g of the corrosion inhibitor per square meter of the kraft paper.

For comparison corrosion inhibiting paper was prepared using known corrosion inhibitors as comparison samples as described below.

Comparison Sample 1
Neutral kraft paper weighing 70 g/m² was impregnated with an aqueous solution of dicyclohexylamine nitrite and then dried with air to prepare a sheet of corrosion inhibiting paper containing 5 g of dicyclohexylamine nitrite per square meter of the kraft paper.

Comparison Sample 2
Neutral kraft paper weighing 70 g/m² was impregnated with an aqueous solution of diisopropylamine nitrite and then dried with air to prepare a sheet of corrosion inhibiting paper containing 5 g of diisopropylamine nitrite per square meter of the kraft paper.

Weathering Test 1

Polished mild steel sheets wrapped with the samples respectively were suspended in a 5 liters desiccator and left to stand under definite conditions of 100 percent R.H. and 55°C to inspect the corrosion inhibiting effect of the samples. After 60 hours, the metal surfaces were observed with the following results.

| Corrosion inhibiting paper | Evaluation |
| --- | --- |
| Sample 1 | 3 |
| Sample 2 | 3 |
| Sample 3 | 3 |
| Sample 4 | 3 |
| Comparison Sample 1 | 2 |
| Untreated kraft paper | 1 |
| Criteria of Evaluation | |
| 3: No rusting. | |
| 2: Rust spots observed. | |
| 1: Rusting observed over the entire surface. | |

Weathering Test 2

Polished mild steel sheets wrapped with the aforementioned samples respectively were subjected to weathering test in the atmosphere containing 0.5 p.p.m. of $SO_2$ and 300 p.p.m. of $CO_2$ and having a minimum humidity of 70 percent, the highest temperature of 30°C and the lowest temperature of 23°C. The number of days taken for a rust spot to occur on the surface of the mild sheet is listed below.

| Corrosion inhibiting paper | Test result (days) |
| --- | --- |
| Sample 1 | 6 |
| Sample 2 | 7 |
| Sample 3 | 8 |
| Sample 4 | 7 |
| Comparison Sample 1 | 5 |
| Untreated kraft paper | 2 |

Weathering Test 3

Polished mild steel sheets wrapped with the aforementioned samples respectively were irradiated with ultraviolet light for 40 hours, using "Due Cycle Weather Meter WE-Sun-HC" (Trade mark, Toyo Rika Kogyo Kabushiki Kaisha, Japan). Thereafter, the metal surfaces were observed with the following results.

| Corrosion inhibiting paper | Test result |
| --- | --- |
| Sample 1 | 3 |
| Sample 2 | 3 |
| Sample 3 | 3 |
| Sample 4 | 3 |
| Comparison Sample 1 | 1 |
| Comparison Sample 2 | 1 |
| Untreated kraft paper | 1 |

The criteria of evaluation is the same as Weathering Test — 1.

Weathering Test 4

Polished mild steel sheets wrapped with the aforementioned samples respectively were subjected to weathering test in the atmosphere containing 1000 p.p.m. of $SO_2$ and having a humidity of 95 percent and a temperature of 25°C. After 24 hours weathering the sheet surfaces were observed with the results shown below.

| Corrosion inhibiting paper | Test result |
| --- | --- |
| Sample 1 | 3 |
| Sample 2 | 3 |
| Sample 3 | 3 |
| Sample 4 | 3 |
| Comparison Sample 1 | 1 |
| Comparison Sample 2 | 1 |
| Untreated kraft paper | 1 |

The criteria of evaluation is the same as Weathering Test — 1.

What we claim is:

1. A ferrous metal treated for resistance to corrosion, said resistance to corrosion resulting from the application to said ferrous metal of a volatile corrosion inhibiting composition containing an imidazole compound of the formula

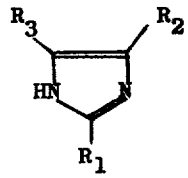

wherein each of $R_1$, $R_2$ and $R_3$ is independently hydrogen, methyl, ethyl, propyl or isopropyl.

2. A ferrous metal of claim 1 in which said imidazole compound is a member selected from the group consisting of imidazole, 2-methylimidazole, 4-methylimidazole, 2,4-dimethylimidazole, 4,5-dimethylimidazole, 2,4,5-trimethylimidazole, 2-ethylimidazole, 2-ethyl-4-methyl-imidazole, 2-propylimidazole, 2-propyl-4-methylimidazole, 2-isopropylimidazole and 2-isopropyl-4-methylimidazole.

3. A ferrous metal of claim 2 in which said imidazole compound is a member selected from the group consisting of imidazole, 2-methylimidazole, 2-ethylimidazole, 2-ethyl-4-methylimidazole and 2-isopropylimidazole.

4. A method for inhibiting corrosion of a ferrous metal which comprises placing a ferrous metal in an atmosphere containing an effective amount of an imidazole compound represented by the formula

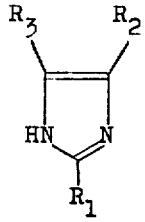

wherein each of $R_1$, $R_2$ and $R_3$ is a hydrogen atom, methyl, ethyl, propyl or isopropyl group.

5. A method for inhibiting corrosion of a ferrous metal which comprises placing a ferrous metal in an atmosphere containing an effective amount of an imidazole compound of the formula

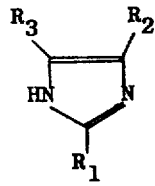

wherein each of $R_1$, $R_2$ and $R_3$ is independently hydrogen, methyl, ethyl, propyl or isopropyl, whereby the corrosion resistance is enhanced through the coating by said imidazole compound.

* * * * *